(12) United States Patent
Sunderland et al.

(10) Patent No.: US 9,711,986 B2
(45) Date of Patent: Jul. 18, 2017

(54) VACUUM CLEANER AND A BATTERY PACK THEREFOR

(71) Applicant: Dyson Technology Limited, Wiltshire (GB)

(72) Inventors: David Robert Sunderland, Bristol (GB); David John Taylor-Pockett, Malmesbury (GB); James Douglas Chisholm, Swindon (GB)

(73) Assignee: DYSON TECHNOLOGY LIMITED, Malmesbury, Wiltshire (GB)

( * ) Notice: Subject to any disclaimer, the term of this patent is extended or adjusted under 35 U.S.C. 154(b) by 592 days.

(21) Appl. No.: 13/763,107

(22) Filed: Feb. 8, 2013

(65) Prior Publication Data

US 2013/0207615 A1    Aug. 15, 2013

(30) Foreign Application Priority Data

Feb. 10, 2012  (GB) .................................. 1202349.5
Jun. 8, 2012    (GB) .................................. 1210139.0

(51) Int. Cl.
| | |
|---|---|
| H02J 7/00 | (2006.01) |
| A47L 9/28 | (2006.01) |
| B25F 5/02 | (2006.01) |
| H01M 2/10 | (2006.01) |
| H01M 10/48 | (2006.01) |

(52) U.S. Cl.
CPC .......... *H02J 7/0063* (2013.01); *A47L 9/2857* (2013.01); *A47L 9/2884* (2013.01); *B25F 5/02* (2013.01); *H01M 2/1022* (2013.01); *H01M 2/1055* (2013.01); *H01M 10/488* (2013.01)

(58) Field of Classification Search
CPC ....................................................... Y02E 60/12

USPC ........................................................... 320/135
See application file for complete search history.

(56) References Cited

U.S. PATENT DOCUMENTS

| 6,351,207 B1 | 2/2002 | Mik et al. | |
| 2004/0134018 A1* | 7/2004 | Conner et al. | 15/339 |
| 2004/0134025 A1* | 7/2004 | Murphy et al. | 15/403 |

(Continued)

FOREIGN PATENT DOCUMENTS

| CA | 1 326 943 | 2/1994 |
| CN | 101455546 | 6/2009 |

(Continued)

OTHER PUBLICATIONS

Search Report dated May 30, 2012, directed towards GB Application No. 1202349.5; 2 pages.

(Continued)

*Primary Examiner* — Suresh Memula
(74) *Attorney, Agent, or Firm* — Morrison & Foerster LLP (57) ABSTRACT

A battery pack suitable for handheld appliance, the battery pack including a plurality of cells and a circuit board associated with the cells, wherein a power terminal is associated with the circuit board and configured to transmit power to an appliance, in use, the battery pack further including a momentary switch operatively connected to the circuit board and movable between closed and open positions by an actuator wherein, when in the open position the power terminal is configured by the circuit to a power delivery state and, when in the closed position, the power terminal is configured by the circuit to a power disabled state.

13 Claims, 10 Drawing Sheets

(56) References Cited

U.S. PATENT DOCUMENTS

| | | | |
|---|---|---|---|
| 2005/0088149 | A1 | 4/2005 | Betancourt |
| 2007/0102471 | A1* | 5/2007 | Gross et al. ................. 227/131 |
| 2010/0088843 | A1 | 4/2010 | Reed et al. |
| 2010/0218386 | A1* | 9/2010 | Ro kamp et al. ............ 30/277.4 |
| 2012/0136493 | A1* | 5/2012 | Adams et al. ................ 700/286 |
| 2013/0198995 | A1* | 8/2013 | Eriksson ........................ 15/383 |

FOREIGN PATENT DOCUMENTS

| | | |
|---|---|---|
| EP | 1075906 | 2/2001 |
| EP | 2008776 | 12/2008 |
| GB | 1 404 800 | 9/1975 |
| GB | 2 440 107 | 1/2008 |
| GB | 2440107 | 1/2008 |
| GB | 2468719 | 9/2010 |
| GB | 2475312 | 5/2011 |
| JP | 5-317225 | 12/1993 |
| WO | WO-2007/009121 | 1/2007 |
| WO | WO-2008/041207 | 4/2008 |
| WO | WO-2010/109215 | 9/2010 |

OTHER PUBLICATIONS

Search Report dated Jul. 21, 2012, directed towards GB Application No. 1210139.0; 1 page.

Search Report and Written Opinion mailed Apr. 29, 2013, directed to International Application No. PCT/GB2013/050119; 16 pages.

\* cited by examiner

VACUUM CLEANER AND A BATTERY PACK THEREFOR

REFERENCE TO RELATED APPLICATIONS

This application claims the priority of United Kingdom Application No. 1202349.5, filed Feb. 10, 2012, and United Kingdom Application No. 1210139.0, filed Jun. 8, 2012, the entire contents of which are incorporated herein by reference.

FIELD OF THE INVENTION

The invention relates to a battery pack, and particularly a battery pack suitable for use in a battery-powered appliance such as a handheld vacuum cleaner.

BACKGROUND OF THE INVENTION

There are various types of vacuum cleaners available on the market, and these can be categorized generally into "cylinder" vacuum cleaners, "upright" vacuum cleaners, "handheld" vacuum cleaners and "stick" vacuum cleaners, also known as "stick-vacs".

In order to provide portability, it is common for handheld vacuum cleaners and stick-vacs to be cordless whereby power is supplied to such devices by way of a battery pack.

An example of a known handheld vacuum cleaner is shown in WO2010/109215 and is marketed internationally by the Applicant under the product name DC34. Here, a handheld cleaning appliance includes a removable battery pack which is generally slab-like in form with an upstanding pillar that is receivable in a dock opening in the end of a handle of the vacuum cleaner. The upper end of the pillar includes electrical terminals that connect to an electrical connector within the handle of the vacuum cleaner. In this way, power in the battery pack can be transferred to the motor of the vacuum cleaner. A trigger switch is provided on the handle and is arranged to actuate an electronic controller internal to the vacuum cleaner in order to turn the vacuum cleaner on and off.

An arrangement as described in WO2010/109215 requires suitable electronic switching means internal to the vacuum cleaner, and it is desired to simplify the switch mechanism and also to improve the assembly of the battery pack.

SUMMARY OF THE INVENTION

Against this background, from a first aspect, the invention provides a battery pack suitable for handheld appliance, the battery pack including a plurality of cells and a circuit board associated with the cells, wherein a power terminal is associated with the circuit board and configured to transmit power to an appliance, in use, the battery pack further including a momentary switch operatively connected to the circuit board and movable between closed and open positions by an actuator wherein, when in the open position the power terminal is configured by the circuit to a power delivery state and, when in the closed position, the power terminal is configured by the circuit to a power disabled state.

Such an arrangement provides significant benefits in operation. In the power disabled state, in which the momentary switch is in a closed position, a very small amount of travel of the actuator results in the momentary switch transitioning from a closed position to an open position, such that the circuit board sets the battery pack into a power delivery state. The short travel required to activate the device appears almost instantaneous to the user. Following activation, the actuator is then able to move through a much larger amount of travel, preferably in the order of 5 mm to 10 mm, without affecting the state of the momentary switch. Therefore, this allows a user to alter finger position on the trigger member without inadvertently turning the machine off. In effect, therefore, the invention provides a light action trigger, but guards against the machine toggling on and off when the user's finger shifts position on the trigger during use, thereby improving ergonomics.

In a second aspect, the invention provides a battery pack suitable for a handheld appliance, the battery pack including a plurality of cells and a circuit board associated with the cells, wherein the plurality of cells and the circuit board are contained within a housing, wherein the housing is defined by first and second separable housing sections which are engageable with one another to form the housing, wherein the circuit board includes an illuminable element that the circuit board is configured to illuminate to indicate the status of the battery pack, wherein the illuminable element forms part of the external surface of the battery pack. The illuminable element therefore fixes one of the housing sections relative to the circuit board and so serves as a locating feature during assembly. Furthermore, since the illuminable element is fixed directly to the circuit board, the circuit board is braced against movement within the battery pack.

In a third aspect, the invention provides a battery pack suitable for a handheld appliance, the battery pack including a plurality of cells and a circuit board associated with the cells, wherein the plurality of cells and the circuit board are contained within a housing, wherein the housing is defined by first and second separable housing sections which are engageable with one another to form a complete housing, wherein the circuit board includes an illuminable element that the circuit board is configured to illuminate to indicate the status of the battery pack, wherein the illuminable element forms part of the external surface of the battery pack and is located intermediate the first and second housing parts.

Preferably the illuminable element is a light pipe.

Preferably, the light pipe has first and second ends that extend transversely across the battery pack and engage the housing on opposing sides thereof by protruding through respective apertures in the housing. This arrangement firmly locks the circuit board and cells against multi-axial movement within the battery pack.

Since the illuminable element is effectively sandwiched between the first and second parts of the housing, the element serves as a locating feature for the housing sections during assembly. A benefit of this is that components of the circuit board, for example power terminals, can be referenced from the illuminable element as a datum position which improves manufacturability. Furthermore, since the illuminable element is held in a fixed position relative to the housing, the circuit board is supported by the element and held rigidly against mechanical shocks to the battery pack.

Further optional and/or preferred features are set out in the dependent claims.

BRIEF DESCRIPTION OF THE DRAWINGS

So that it may be more readily understood, embodiments of the invention will now be described by way of example only with reference to the accompanying drawings, in which.

DETAILED DESCRIPTION OF THE INVENTION

Figure 1:
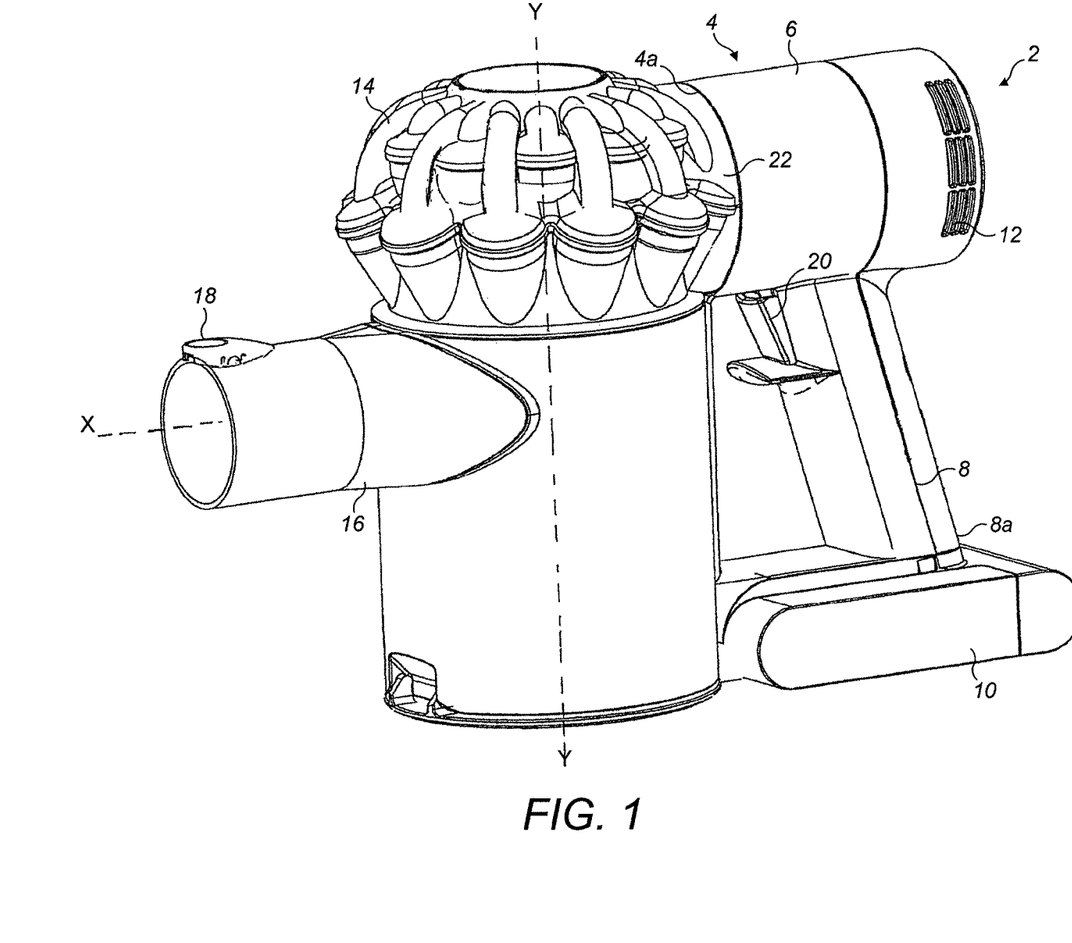
FIG. 1 is a perspective side view of a handheld vacuum cleaner in which a battery pack in accordance with an embodiment of the invention is incorporated.
Figure 2:
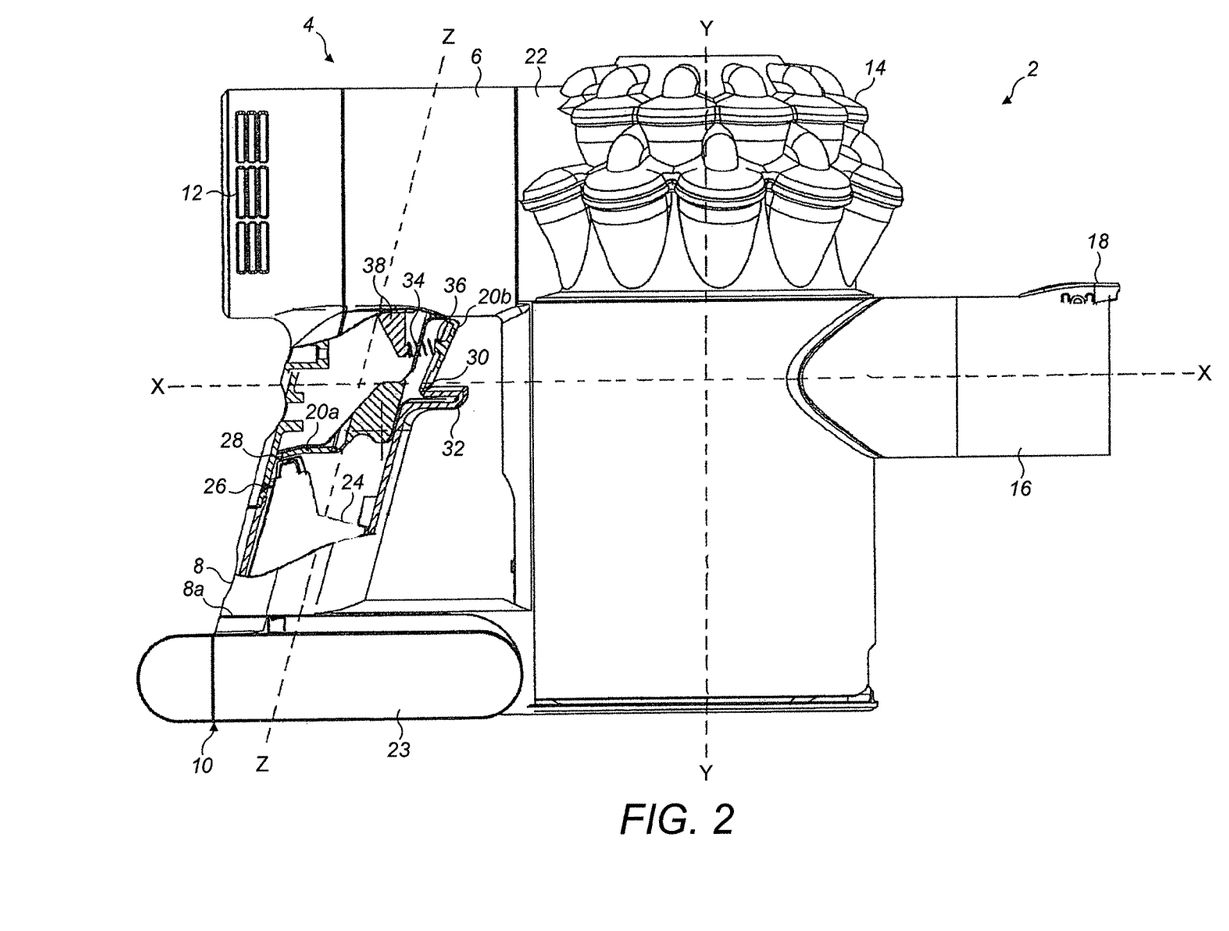
FIG. 2 is a side view of the vacuum cleaner in FIG. 1 with a section of the handle cut away.

Referring firstly to FIGS. 1 and 2, a handheld vacuum cleaner 2 has a main body 4 which houses a motor and fan unit, an outer housing of which is indicated generally at 6. The motor and fan unit 6 is located above a generally upright handle or grip portion 8. The lower end 8a of the handle 8 supports a generally slab-like battery pack 10. A set of exhaust vents 12 are provided on the main body 4 for exhausting air from the handheld vacuum cleaner 2.

The main body 4 supports a cyclonic separating apparatus 14 that functions to remove dirt, dust and other debris from a dirt-bearing airflow drawn into the vacuum cleaner by the motor and fan unit. The cyclonic separating apparatus 14 is attached to a forward part 4a of the main body 4 and an air inlet conduit/nozzle 16 extends along a longitudinal axis X-X from a forward portion of the cyclonic separating apparatus 14 that is remote from the main body 4. The air inlet nozzle 16 is configured so that a suitable brush tool can be mounted to it and includes a catch 18 for securely holding such a brush tool when the tool is engaged with the inlet. The brush tool is not material to the present invention and so is not shown here. An elongate extension tube or wand (not shown) may also be mounted to the air inlet nozzle 16 to extend the cleaning reach of the vacuum cleaner.

The cyclonic separating apparatus 14 is located between the main body 4 and the air inlet nozzle 16 and has a longitudinal axis Y-Y which extends in a generally upright direction so that it is substantially orthogonal with the longitudinal axis X-X of the inlet nozzle 16. The handle 8 extends along an axis Z-Z that lies at a shallow angle to the axis Y-Y and which, in the exemplary embodiment is approximately 10 degrees, although any angle from orthogonal to about 20 degrees is suitable.

The handle 8 is oriented in a pistol-grip formation which is a comfortable interface for a user since it reduces stress on a user's wrist during cleaning. The cyclonic separating apparatus 14 is positioned close to the handle 8 which also reduces the moment applied to the user's wrist when the handheld vacuum cleaner 2 is in use. The handle 8 carries an on/off switch arrangement in the form of a trigger member 20 for turning the motor and fan unit 6 on and off. In use, the motor and fan unit draws dust laden air into the vacuum cleaner 2 via the air inlet nozzle 16. Dirt and dust particles entrained within the air flow are separated from the air and retained in the cyclonic separating apparatus 14. The cleaned air is ejected from the rear of the cyclonic separating apparatus 14 and conveyed by a short duct section 22 to the motor and fan unit 6 located within the main body 4, and is subsequently expelled through the air outlets 12 which may also include a fine particle filter by way of a final filtering stage to remove micro-contaminants from the airflow that exits the cleaner.

It should be noted at this point that although the cyclonic separating apparatus described here is cyclonic, this is not essential to the invention and other separating apparatus are viable, for example other bagless-type separating apparatus which feature a fibrous filter element in a whirl-chamber to separate contaminants from the airstream, or even a bagged-type separating apparatus as is known in the art. The precise configuration of the cyclonic separating apparatus is not material to the present invention and so will not be described in detail here. However, one particular configuration of cyclonic separation that is suitable is described in the Applicant's co-pending application GB2475312A.

Turning now to FIG. 2, there is shown a side view of the handheld vacuum cleaner 2 in FIG. 1 but with a portion of the outer skin of the handle cutaway so the interior of the handle can be seen and, in particular, the on/off trigger arrangement.

The battery pack 10 has a generally rectangular block-like base portion 23. An upstanding post or pillar portion 24 extends upwardly at an angle of approximately 80° to the plane of the base portion 23, although it should be noted that the precise angle of inclination does not form part of the invention. The handle 8 is tubular in cross section with a generally oval shape that complements the cross section of the pillar 24 of the battery 10. Therefore, the pillar 24 of the battery 10 is receivable by the open lower end 8a of the handle 8 so that the battery pack 10 may be docked onto the vacuum cleaner 2.

An upper end of the pillar 24 includes electrical terminals that connect to corresponding electrical connectors housed in the interior of the handle 8 and which lead to an electronic control module (not shown) that is interfaced to the motor and fan unit. Electrical power is therefore transmitted from the battery pack 10 to the motor and fan unit 6 via the electrical connectors.

The pillar 24 also includes a mechanically actuated switch unit 26 that is oriented so as to extend upwardly from the top face of the pillar 24. The switch unit 26 includes an actuator 28 and is operated by an end of the trigger member 20, as will now be described.

The trigger member 20 takes the form of a bell crank having a first end 20a in the form of an actuating finger that is engageable with the battery switch unit 26 and a second end 20b that provides a contact face for the trigger member 20 and which protrudes through a forwardly facing aperture 30 in the handle 8. The contact face 20b of the trigger is seen clearly in FIG. 1 extending through the aperture 30. A plate-like finger rest 32 extends forwardly from the handle 8 at a position just below the aperture 30 and provides a means to prevent a user's finger from slipping off the trigger member 20 in use. It also allows a user to grasp the handle without actuating the trigger, during carrying for example.

The trigger member 20 is biased into a non-actuating position by a biasing means which in this element is a spring element 34 that extends between a spring retaining member 36 provided on the rear of the contact face 20b and a spring abutment member 38 provided in the handle 8. The spring element 34 therefore biases the trigger member such that the contact face 20b protrudes from the aperture 30 in the handle and the actuating finger 20a is spaced from the actuating switch unit 26 of the battery pack 10. When the trigger member 20 is in this position, the motor and fan unit 6 does not operate. Expressed another way, the trigger arrangement takes the form of a so-called 'dead man's trigger' which will only operate the vacuum cleaner whilst it is being depressed by a user.

Figure 3:
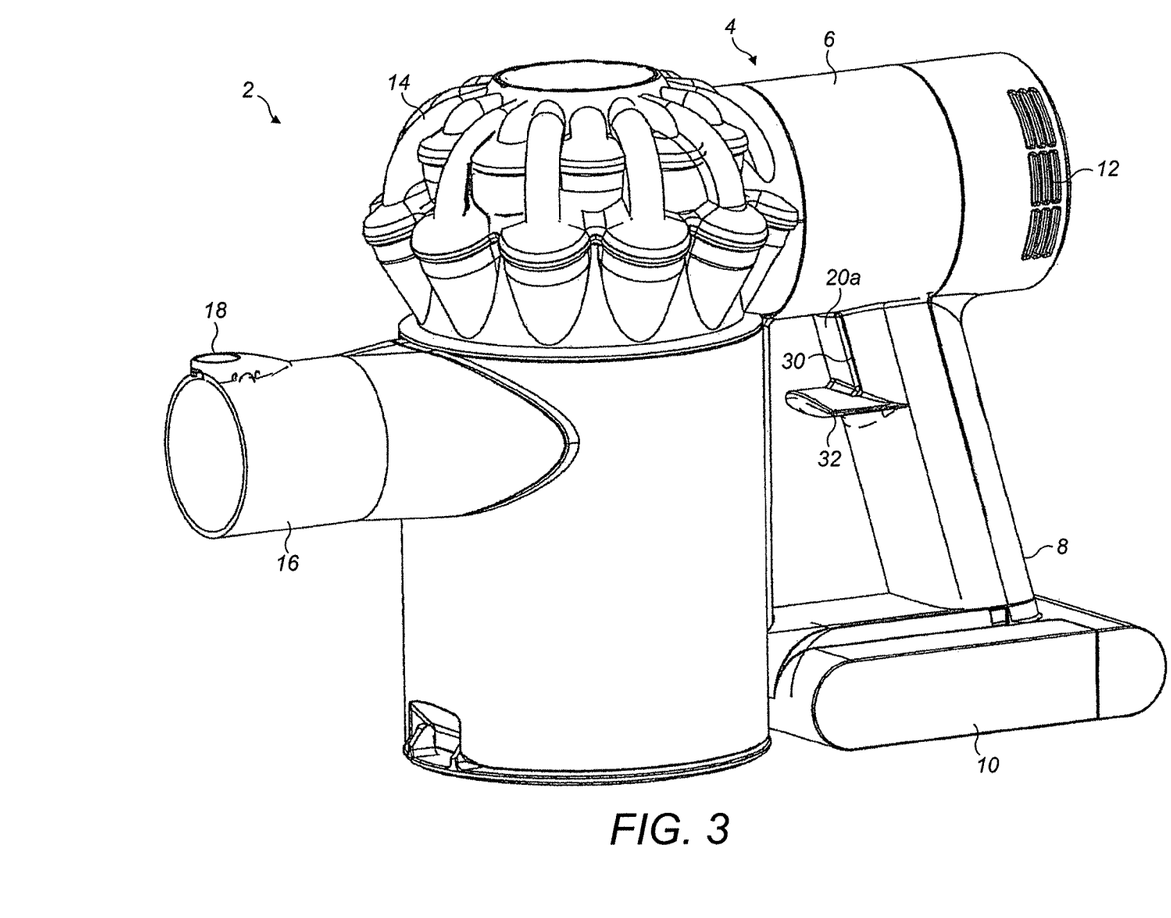
FIG. 3 is a perspective side view of the handheld vacuum cleaner in FIG. 1 but with the operating trigger/switch in a second position.
Figure 4:
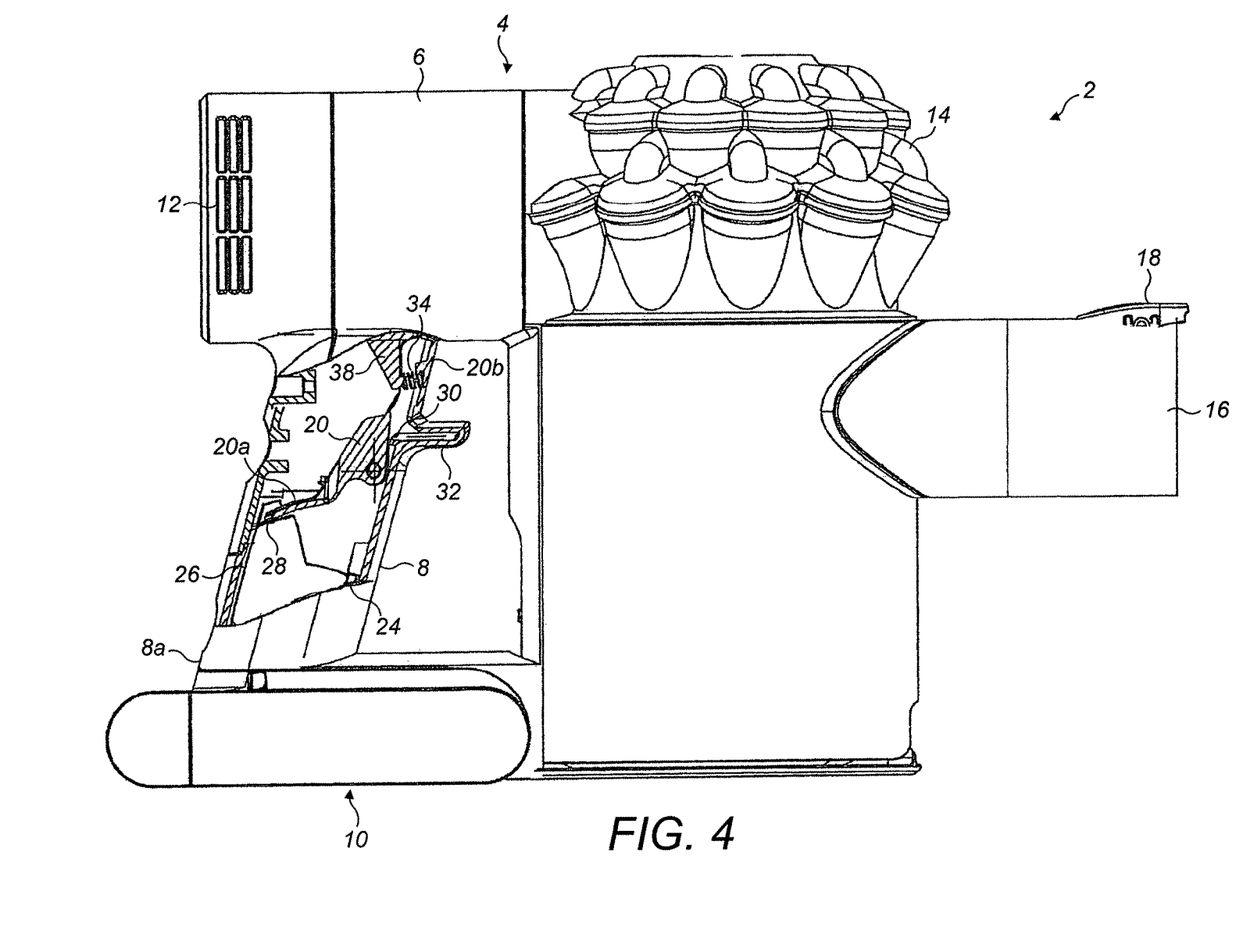
FIG. 4 is a side view of the vacuum cleaner, as in FIG. 2, but with the operating trigger in the second operating position.
Figure 5:
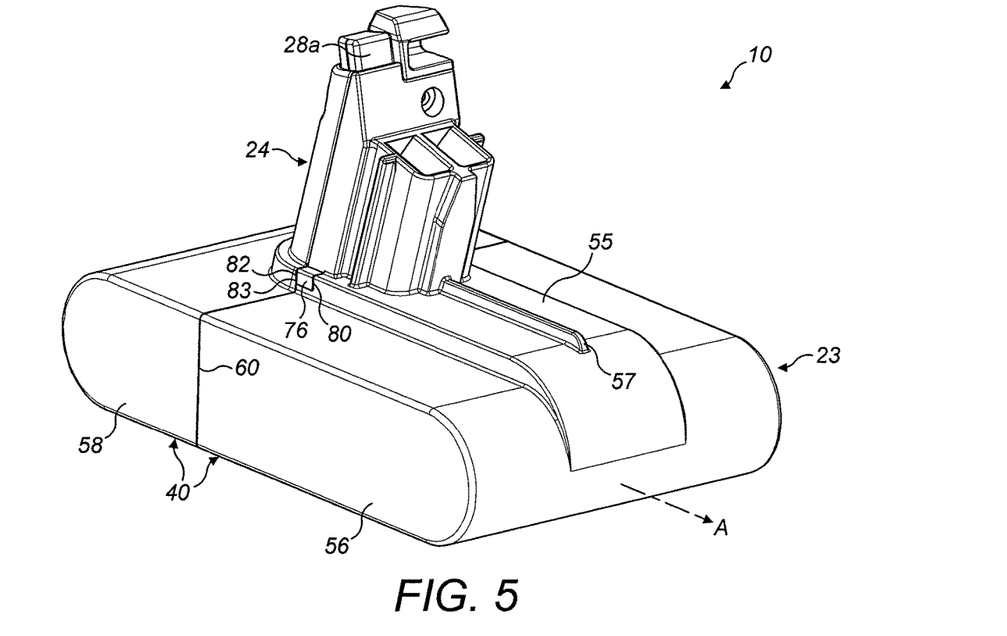
FIG. 5 is a perspective view of the battery pack removed from the handheld vacuum cleaner.
Figure 6:
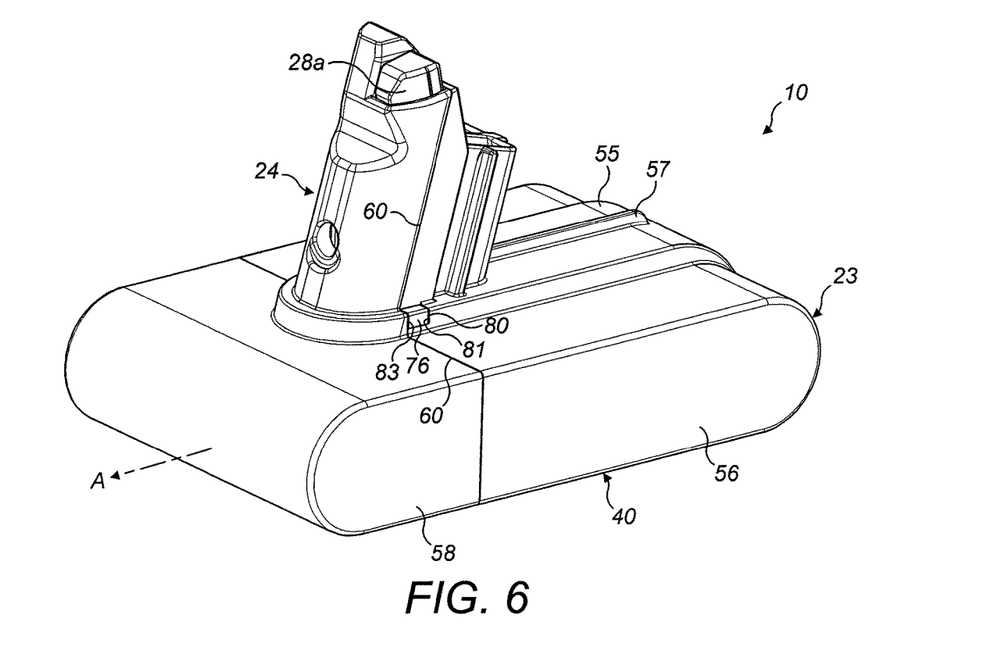
FIG. 6 is a perspective view of the battery pack in FIG. 5, but from a reversed angle.

In order to operate the vacuum cleaner 2, a user depresses the trigger member 20 to an operating position, which is shown in FIGS. 3 and 4. In this position, the activating finger 20a of the trigger member 20 engages the activating switch unit 26 of the battery pack 10 which initiates power supply to the electronic control module of the motor and fan unit 6 thereby operating the vacuum cleaner. Also, in this position the contact face 20b of the trigger member 20 recedes into the trigger aperture 30 on the handle 8 so that it lies substantially flush with the adjoining portions of the handle 8.

The battery pack 10 will now be described in more detail with reference to FIGS. 5 to 9, in which the battery pack 10 is separated from the appliance and in which the interior components of the battery pack 10 are shown in detail.

As has been mentioned, the battery pack 10 generally comprises a block-like base portion 23 and a pillar portion 24 that extends upwardly away from the base. These portions of the battery pack 10 are defined by a two-part housing 40.

The housing 40 serves to contain the operational components of the battery pack 10, the major parts being a cell assembly 42 and the switching unit 26 as has been referred to above. The cell assembly 42 comprises a plurality of cells 44 (six in this embodiment) which are cylindrical in form and mounted in a cell block or cage 46 in parallel so that their longitudinal axes are transverse to the long axis 'A' of the battery pack 10. A circuit board 48 is mounted to the cell block 46, which may be a plastics material, and carries all the necessary electronics required to control the delivery of power from the cells 44 to electrical terminals 50 of the battery pack, and to control the recharging of the cells. It should be noted that the electrical terminals are mounted directly to the circuit board 48 and extend upwardly away therefrom—this provides the terminals with a rigid mounting point and does not require a dedicated connector block to be coupled to the housing in some manner. Ends of adjacent cells 44 having opposite polarity are connected by cell connectors 52, two of which are show in FIG. 7, and the cell connectors 52 are linked to the circuit board 48 by voltage monitoring tabs 54 by which means the control circuitry is able to monitor the voltages on individual cells. Power take-off tabs 55 are provided on the first and last cells in the group and it will be seen that the power take-off tabs 55 are relatively thick compared to the voltage monitoring tabs 54 in order to cope with high current values. The circuit board 48 is mounted on top of the cell block 46 and, in this embodiment extends along its longitudinal axis 'A' in parallel therewith. Since the housing 23 defines a close fit with the cells, an elongated protrusion or 'hump' 55 is provided on the housing which stands proud of the remainder of the battery pack and so provides additional internal volume to accommodate the circuit board 48. A longitudinal rib 57 extends along the upper surface of the hump 55 and provides a means to strengthen the engagement with the vacuum cleaner. The exact form of the circuit board 48 design is not central to the invention and so will not be described in detail.

The two-part housing 40 is defined by first and second housing sections 56, 58. The housing is split so that each of the sections 56, 58 defines a part of the block-like base portion 23 or 'cell housing' and a part of the pillar portion 24. The first housing section 56 is shown to the right in FIGS. 5 to 7, and the second housing section 58 is shown on the left. Accordingly, the split line 60 between the first and second sections 56, 58 can be seen running substantially vertically along the base portion 23 and the pillar portion 24.

The pillar portion 24 contains the switch unit 26 of the battery pack 10, as has been generally described above. In more detail, the switch unit 26 comprises the actuator 28 and a momentary switch 64 that is connected to the circuit board 48. In this embodiment, the momentary switch 64 is a miniature snap-action switch as is generally known in the art as a microswitch.

Figure 7:
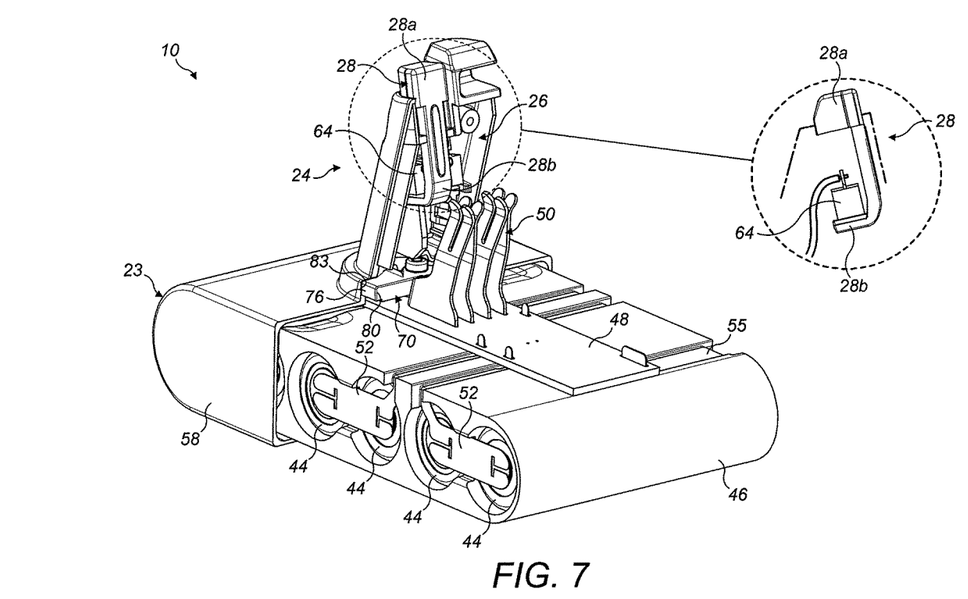
FIG. 7 is a perspective view of the battery pack, like that in FIG. 5, but with a forward portion of the battery pack housing removed to show internal detail of the battery pack.

In the position shown in FIG. 7, the battery pack 10 is in a power disabled state, so that the circuit board 48 does not deliver a voltage to the terminals 50 of the battery pack. In this state, a contacting part 28a of the actuator 28 protrudes upwardly from the pack, more specifically the upper surface of the pillar 24—this is the position also shown in FIG. 2. The end of the actuator 28 distal from the contacting part 28a defines an actuating part 28b which in the form of a right-angled leg which extends underneath the momentary switch 64. In this position, since the contact part 28a of the actuator 28 is urged upwardly by a spring element (not shown) the actuating part 28b is engaged with the momentary switch 64, so that the momentary switch 64 is in a closed position.

Figure 8:
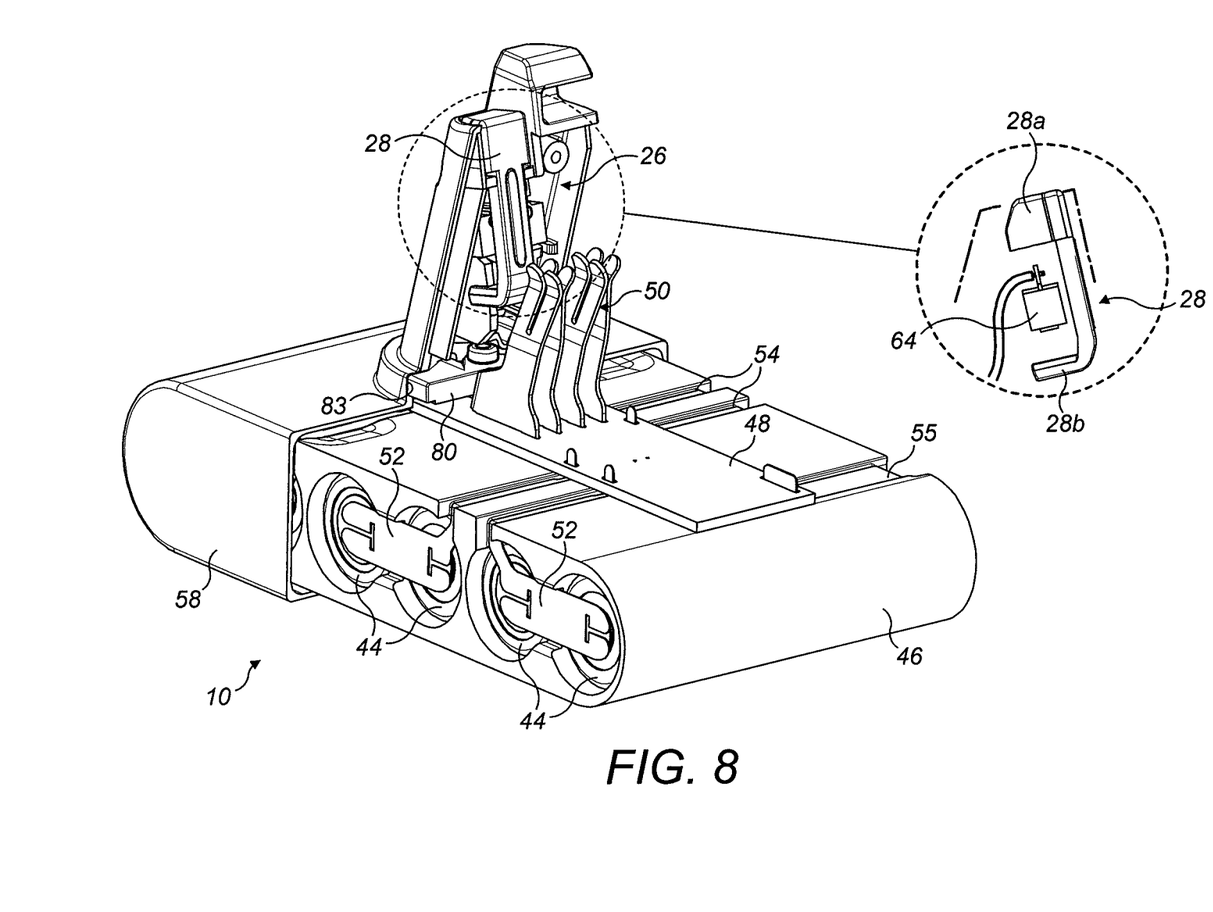
FIG. 8 is a view identical the same as that in FIG. 7, but with the switch unit in a second operating position.
Figure 9:
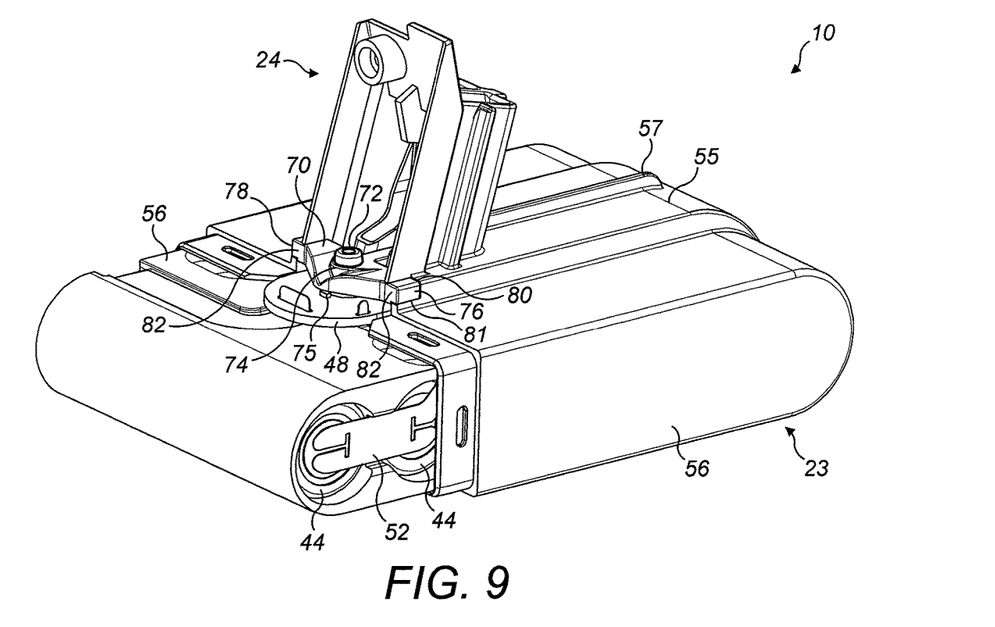
FIG. 9 is a perspective view of the battery pack, like that in FIG. 6, but with a rear portion of the battery pack housing removed to show internal detail of the battery pack.

FIG. 8 shows the battery pack 10 in a power delivery state. In this state, the contact part 28a of the actuator 28 has been pressed downward and so is recessed into the pillar 24. Accordingly, the actuating part 28b of the actuator 28 is moved out of contact with the momentary switch 64, so that the momentary switch 64 is set to an open position. The circuit board 48 electronics are configured to detect the opening of the momentary switch 46 and trigger power delivery to the terminals 50 of the battery pack.

Such an arrangement of the actuator 28 and the momentary switch 64 has significant benefits in operation. In the power disabled state illustrated in FIG. 7, in which the momentary switch 64 is in a closed position, a very small amount of travel of the actuator 28 results in the momentary switch 64 transitioning from a closed position to an open position, such that the circuit board 48 sets the battery pack into a power delivery state.

As the switch unit 26 is operated mechanically by the trigger member 20, the short travel required to activate the device appears almost instantaneous to the user. Following activation, the actuator 28 is then able to move through a much larger amount of travel, in the order of 5 mm to 10 mm, without affecting the state of the momentary switch 26. Therefore, this allows a user to alter finger position on the trigger member 20 without turning the machine off. In effect, therefore, the invention provides a light action trigger, but guards against the machine toggling on and off when the user's finger shifts position on the trigger during use. The ergonomics of the vacuum cleaner are improved as a result.

The battery pack 10 of the invention also includes a feature to assist in its assembly, as will now be explained. The circuit board 48 includes a status indicator 70 which is operable in use to illuminate in various circumstances, for example when the battery charge level is low, and when the battery pack is being charged.

In this embodiment, the status indicator 70 is an illuminable element in the form of a light pipe that is surface-mounted to the circuit board 48 in the region of the pillar portion 24. Here, the light pipe 70 is secured in place on the circuit board by a screw 72 that passes through a central boss 74, although it will be appreciated that the light pipe 70 may be affixed to the circuit board 48 by other techniques, such as using an epoxy. Alternatively, the light pipe 70 could include a projecting feature, such as a stud, that is press-engaged with a complementary-shaped recess in the circuit board. The light pipe 70 is located on top of a light emitting diode 75 (shown in FIG. 9) that is secured to the circuit board 48 underneath the light pipe 70.

The light pipe 70 may be manufactured from any suitable materials known in the art, such as glass or, more preferably, an optical grade plastic such as polycarbonate.

The light pipe 70 is bar-like in shape and extends transversely across the circuit board 48 in a direction that is generally perpendicular to the longitudinal axis A of the battery pack 10, and therefore generally in parallel with the cells 44. The light pipe 70 has first and second ends 76, 78, each of which protrudes through the housing 40 at a point towards the base of the pillar portion 24. The light pipe therefore forms part of the external surface of the battery pack 10. It should be noted here that a single light source is split via the light pipe two ways so as to provide an indicator on either side of the battery pack.

The ends 76, 78 of the light pipe 70 serve to position correctly the first and second sections 56, 58 of the housing 40. For this purpose, each end of the light pipe 70 includes a first abutment surface 80 that is engageable with a corresponding abutment surface 81 of the first housing section 56, and a second abutment surface 82 which is engageable with a corresponding abutment surface 83 of the second housing section 58. It should therefore be appreciated that the ends 76, 78 of the light pipe 70 are in a position so as to sit intermediate the first and second housing parts, that is to say, on the split line 60 of the two-part housing 40.

In this embodiment, the light pipe ends 76, 78 are rectilinear, preferably rectangular, and fit into a complementary-shaped cut-out in the first housing section 56. This ensures a close fit between the light pipe 70 and the housing sections 56, 58. However, the light pipe ends 76, 78 could be alternative shapes, for example circular or oval, and still provide the necessary abutment surface for the housing sections 56, 58. Furthermore, both the first and second housing sections 56, 58 may include cut-outs to define a suitably shaped aperture for the light pipe ends.

Since each of the first and second housing sections 56, 58 abut up against the light pipe 70, the light pipe serves as a locating feature for the housing sections during assembly.

This increases the rigidity of the battery pack housing 40 as a whole, and ensures that the housing sections 56, 58 are properly positioned with respect to the cells. Furthermore, since the light pipe 70 is held in a fixed position relative to the housing, since it is sandwiched between the housing sections 56, 58, the circuit board 48 is supported by the rigidly held light pipe. This increases its resilience to mechanical shock and reduces the need for other fastening means (epoxies, for example) to join the circuit board 48 securely to the cell block 46. Also, since the light pipe engages with the housing, and the light pipe is attached securely to the circuit board, the light pipe serves as a datum point for the terminals of the circuit board so that they are positioned precisely within the pillar portion 24 of the housing.

The skilled person would be aware that various modifications could be made to the specific embodiments described above without departing from the broad concept of the invention as defined by the claims.

For example, although the specific embodiment includes a light pipe 70 having two ends 76, 78, both of which protrude from the split line 60 between the first and second housing sections 56, 58 of the battery pack 10, a similar effect could be achieved if the light pipe 70 only had one protruding part. Similarly, it is not essential that the light pipe 70 protrude from the housing 40 at a location close to the base of the pillar 24, although this location has been found to be convenient in this embodiment. In principle the status indicator 70 could protrude from the housing 40 at any point along the split line 60 between the first and second housing sections 56, 58.

Figure 10:
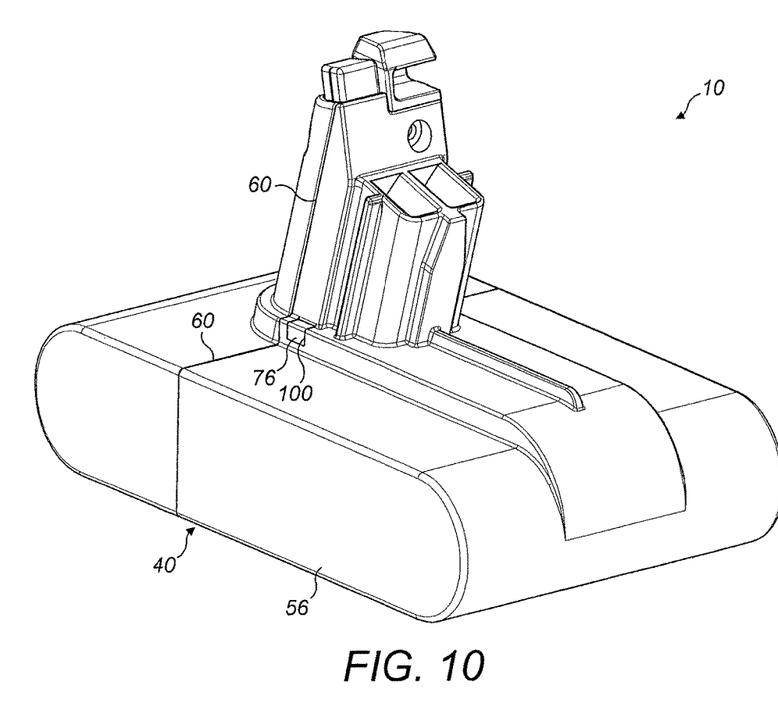
FIG. 10 is a perspective view of a battery pack of an alternative embodiment of the invention.
Figure 11:
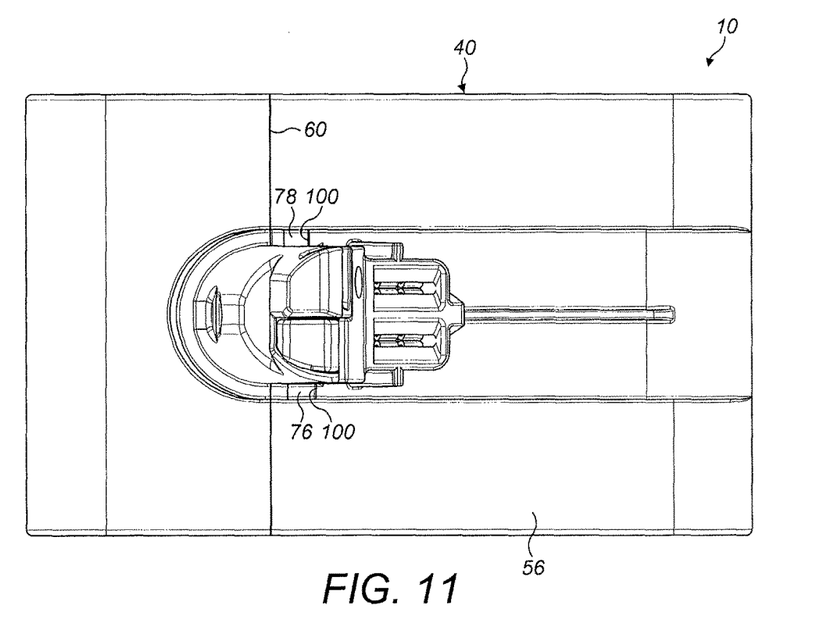
FIG. 11 is a view from above of the battery pack in FIG. 10.

A further embodiment is shown in FIGS. 10 and 11. This embodiment is substantially the same as the embodiments described above so only the differences will be described here.

In this embodiment, the ends 76, 78 of the light pipe 70 extend to the surface of the battery pack housing as in previous embodiments. However, the ends of the light pipe do not sit on the split line 60 between the first and second housing sections 56, 58.

Instead, the ends 76, 78 of the light pipe sit in a complementary shaped aperture defined in the first housing section 56, that is to say an aperture defined wholly by one of the housing sections instead of being defined partly by each housing section. Such an arrangement provides the same benefits as in previous embodiments, chief of which is to provide a secure mounting point to position the circuit board and the battery pack relative to the battery pack housing.

During assembly, the first housing section is received onto the cell block and the housing deforms slightly to enable the light pipe ends 76, 78 to snap-fit into their respective apertures. The light pipe ends 76, 78 therefore engage the housing section 76 at two opposed points and so brace the circuit board against movement along multiple axes. In this embodiment, therefore, the light pipe serves to hold the circuit board in a fixed position relative to the housing, and also acts as a datum point for the components of the circuit board, for example the power terminals, relative to the housing.

The invention claimed is:

1. A battery pack suitable for handheld appliance, the battery pack including a plurality of cells and a circuit board associated with the cells, wherein a power terminal is associated with the circuit board and configured to transmit power to an appliance in use, wherein the battery pack further includes a momentary switch operatively connected to the circuit board and movable by an actuator between a closed position in which a conductive path through the momentary switch is unbroken and an open position in which the conductive path through the momentary switch is broken, and wherein, when the momentary switch is in the open position, the power terminal is configured by the circuit board to a power delivery state and, when the momentary switch is in the closed position, the power terminal is configured by the circuit board to a power disabled state.

2. The battery pack of claim 1, wherein the actuator includes a contact part and an actuating part and is operable between first and second positions corresponding to the closed and open positions of the momentary switch, respectively, wherein in the first position the contact part of the actuator protrudes from a portion of a battery pack housing and the contacting part contacts the momentary switch and wherein, when in the second position, the contact part is receded into the portion of the battery pack housing and the actuating part is spaced from the momentary switch.

3. The battery pack of claim 1, wherein the momentary switch and the actuator are housed within a pillar portion of the battery pack housing which extends away from a cell-housing portion of the battery pack housing.

4. The battery pack of claim 3, wherein the cell-housing portion of the battery pack houses a plurality of cells.

5. The battery pack of claim 4, wherein the plurality of cells are arranged in parallel.

6. The battery pack of claim 4, wherein the circuit board is carried on the cells.

7. The battery pack of claim 6, wherein the circuit board extends in parallel to the cells.

8. The battery pack of claim 6, wherein the circuit board is housed in a part of the cell housing portion which stands proud of the remainder of the battery pack housing.

9. The battery pack of claim 1, wherein the momentary switch is a miniature snap-action switch.

10. The battery pack of claim 1, wherein the battery pack housing is formed of first and second sections, the first section defining a first part of the cell housing portion and the pillar portion, and the second section defining a second part of the cell-housing portion and the pillar portion.

11. A battery pack suitable for handheld appliance, the battery pack including a plurality of cells and a circuit board associated with the cells, wherein the battery pack includes a generally planar cell housing portion, and a pillar portion that extends away from the cell housing portion, wherein the pillar portion includes a power terminal operatively connected to the circuit board and arranged to transmit power to an appliance, in use, and a momentary switch operatively connected to the circuit board and movable by an actuator between an open position in which the conductive path through the momentary switch is broken and a closed position in which the conductive path through the momentary switch is unbroken, and wherein, when the momentary switch is in the open position, the power terminal is configured by the circuit board to a power delivery state and, when the momentary switch is in the closed position, the power terminal is configured by the circuit board to a power disabled state.

12. The battery pack of claim 11, wherein the actuator includes a contact part and an actuating part and is operable between first and second positions corresponding to the closed and open positions of the momentary switch, respectively, wherein in the first position the contact part of the actuator protrudes from a portion of a battery pack housing and the contacting part contacts the momentary switch and wherein, when in the second position, the contact part is receded into the portion of the battery pack housing and the actuating part is spaced from the momentary switch.

13. The battery pack of claim 11, wherein the momentary switch is a miniature snap-action switch.

* * * * *